United States Patent Office

3,056,723
Patented Oct. 2, 1962

3,056,723
METHOD OF PREPARING PELLETIZED
PESTICIDAL COMPOSITIONS
Arthur L. Galloway, Mentor, Ohio, assignor to Diamond Alkali Company, Cleveland, Ohio, a corporation of Delaware
No Drawing. Filed Nov. 21, 1960, Ser. No. 70,448
7 Claims. (Cl. 167—42)

This invention relates to methods for preparing biologically active compositions of matter and in particular to methods for preparing compositions for use in killing or preventing undesirable pests.

This application is a continuation-in-part of my copending application, Serial No. 779,530, filed December 11, 1958, now abandoned.

It is to be understood, that as used hereinafter, the term "pesticide" or "pesticidal composition" is meant to refer to those toxicant compositions which are effective in killing or controlling the growth of plants, insects, microorganisms, fungi, bacteria and the like, and it is intended to refer broadly to those compositions commonly known as insecticides, bactericides, fungicides, nematocides, herbicides and the like.

Various types of pesticides have been proposed and are currently in use. These materials are characterized by their ability to attack or exterminate certain undesirable species of pests, their action being selective in that desirable species are left substantially unaffected and in a more or less healthy or vigorous state. The pesticidal compositions which have been used include both inorganic and organic chemicals or compositions, some of the more common materials being the following:

DDT (2,2-bis(p-chlorophenyl)-1,1,1-trichloroethane)
2,4-D (2,4-dichlorophenoxyacetic acid)
2,4-D (isopropyl ester)
2,4,5-T (2,4,5-trichlorophenoxyacetic acid)
Dieldrin (1,2,3,4,10,10 - hexachloro-exo-6,7-epoxy-1,4,4a, 5,6,7,8,8a - octahydro - 1,4 - endo,exo - 4,8-dimethanonaphthalene)
Sesone (sodium 2,4-dichlorophenoxyethyl sulphate)
Endrin (1,2,3,4,10,10-hexachloro-exo-6,7-epoxy-1,4,4a,5, 6,7,8,8a - octahydro-1,4,5,8-endo,endo-dimethano-naphthalene)
Heptachlor (1,4,5,6,7,8,8 - heptachloro-3a,4,7,7a-tetrahydro-4,7-endomethanoindene)
Malathion (S - (1,2 - dicarbethoxyethyl) - O,O - dimethyl phosphorodithioate)
Parathion (O,O-diethyl O-p-nitrophenyl phosphorothioate)
DDVP (dimethyl dichlorovinyl phosphate)
Ovex or Ovotran (p-chlorophenyl p-chlorobenzenesulphonate)
Lindane (gamma-1,2,3,4,5,6-hexachlorocyclohexane)
Natrin (sodium 2,4,5-trichlorophenoxyethyl sulphate)
3,4-dichlorotetrahydrothiophene 1,1-dioxide
3,3,4,4-tetrachlorotetrahydrothiophene 1,1-dioxide
Dimethyl-2,3,5,6-tetrachloroterephthalate One method of applying pesticidal agents of the type described above involves dissolving the agent in an appropriate solvent, with or without a surfactant, such as, water, kerosene, fuel oil, toluene, xylenes, etc., and applying the resulting solution, usually in the form of a spray, to the area desired to be treated. Alternatively, the pesticidal agent may be dry mixed with a pulverulent diluent, such as, talc, finely-divided diatomaceous earth, ground pumice, Fuller's earth, whiting, etc., and the resulting active dust applied to the areas to be treated. While these methods are suitable for application at close range and where there is no danger of contamination of adjacent areas in which certain vegetation, insects, microorganisms or the like might be damaged, there has always been a distinct hazard in that particles of active spray or dust may be carried over on to adjacent areas with harmful effects due either to the method of application or to the fact that the particles of active agent are miscarried by wind or air currents. Additionally, sprays or dusts cannot be applied to areas lying under heavy foliage, as the fine particles of the spray or dust will not penetrate the foliage. Progress in the application of pesticidal agents by aircraft has been retarded because of the above-mentioned difficulties.

Attempts have been made to solve these problems by incorporating the pesticidal agents into or upon pellets consisting essentially of fuller's earth, natural clays, such as, attaclay, pumice, calcined diatomaceous earth, or other pelletized powders. While such pellets lend themselves to control distribution by aircraft over a designated area, they leave much to be desired in that the bonding agents employed during the pelletizing operations are usually water soluble. The pellets are, therefore, adversely affected by rainfall or conditions of high humidity which cause slacking and progressive disintegration of the pellets. During periods of reduced humidity or drought, the resulting disintegrating pellets form dust which may be picked up by prevealing winds, thereby causing damage to adjacent areas where the presence of such agents would be undesirable. Furthermore, the disintegration of such pellets accelerates the release of the pesticidal agents and the effective life or period activity of the pelletized composition is thereby substantially reduced.

Additionally, in the preparation of such pelletized pesticidal compositions, the pesticides are dissolved in a solvent and the solvent solution used to contact the pellets, the solvent being evaporated so as to deposit the pesticide on or in the pellets. The solvents are generally expensive and toxic both to humans and to plants, and it is additionally very difficult to recover the solvents when they are evaporated. Similarly, problems of storing large quantities of solvent for use as well as the flammability of most of these solvents, are also encountered. Where cheaper solvents, such as, water, are used, they are volatilized only with difficulty and hence are often left in the pellets. Moreover, during the solvent impregnation of pesticides on a preformed granule, fines are produced, which, although recoverable, cannot be used in preparing subsequent batches of granules and hence are not readily usable. Problems are also encountered in using pesticides, such as, the above-mentioned Heptachlor, Endrin and Dieldrin, in that they are sensitive to the material of which granules have heretofore been formed and, hence, the granules must be deactivated before being impregnated with the pesticide.

It has also been found that the physical characteristics of the presently-produced pellets cannot be materially altered so that the porosity, hardness and so forth of the pellets will pe controlled by the material of which it is made. This presents problems, in that, for different types of applications, it is desired to change the porosity or hardness of the pelletized pesticide. To do this, at present, it is necessary to alter the composition of the pellet in which the pesticide is impregnated by using a different material for the pellet. Finally, it has been found that many of the pesticides in use today are only slightly soluble in the common solvents or are soluble only in water and, hence, do not lend themselves readily for granule preparation.

It is, therefore, an object of the present invention to provide a method for preparing a novel, effective, biologically active material in pelletized form without the use of solvents.

Another object of the present invention is to provide a method for preparing novel, effective, biologically active agents, and in particular pesticidal agents, having improved properties with respect to length of active service, resistance to disintegration due to climatic conditions and resistance to deformation and disintegration during application.

A further object of the present invention is to provide a method for preparing such compositions which is easily carried out and readily adaptable for use with a wide variety of biologically active materials.

Another object of the present invention is to provide such a method wherein the physical properties of the pellets, such as, hardness and porosity, can be easily varied without the necessity of changing the basic material of which the pellet is formed.

These and other objects will become apparent to those skilled in the art from the description of the invention which follows.

The method of the present invention envisions forming a mixture containing a dehydrated calcium sulphate, i.e., the anhydrous or the hemi-hydrate form, a biologically active substance, such as, a pesticidal agent, which may be in the form of a wettable powder or a dust concentrate. To this mixture is added only sufficient water to form the dihydrate of calcium sulphate and effect the formation of pellets containing the biologically active material incorporated therein. Additionaly, the present method envisions that a portion of the dehydrated calcium sulphate can be replaced with a common clay, such as, attaclay, or a dispersing and/or a swelling agent, such as, sodium bentonite, wheat flour, wood flour, or the like, thus giving a polletized composition having a variety of hardnesses and porosities. By this method of forming the granular material, it is not necessary to make a solvent solution of the pesticidal agent, and hence evaporation of this solvent is not necessary and the problems encountered in the use of such solvents are prevented. Along this same line, it is found that by the present method, pesticides which are insoluble or only very slightly soluble in water or other solvents are easily formed into granules where heretofore with these materials it has been necessary to make a slurry of the material in order to form granules having the desired pesticide concentration. It has also been found that the dehydrated calcium sulphate of the present granules, does not have to be deactivated prior to being incorporated with some of the more sensitive pesticides, such as, Dieldrin, Endrin and Heptachlor.

Exemplary of the dehydrated calcium sulphate which may be used in the present method are those materials, such as, dental plaster, which are commonly referred to as plaster of Paris. Accordingly, for convenience, reference will be made hereinafter to plaster of Paris as being the preferred dehydrated calcium sulphate. This, however, is not to be taken as limiting the present invention.

In forming the granular pesticidal composition by the method of the present invention, 25 to 90 parts by weight of plaster of Paris are mixed with 2 to 40 parts by weight of a 50% concentration dust concentrate or wettable powder of the pesticide. Additionally, 0 to 60 parts by weight of a clay, such as, attaclay or kaolin, may also be added. If desired, all or a portion of the clay may be replaced with a dispersing or swelling agent, such as, bentonite, wheat flour or wood flour, so as to cause a more rapid disintegration of the granules when they have been applied to the soil. To this dry mixture is added only sufficient water to form the dihydrate of calcium sulphate and to provide the excess necessary to effect the formation of pellets. The mixture is stirred constantly during the addition of the water until pelletizing of the mixture is produced. The moist mixture is then dried and screened to obtain granules of a size of between 10 and 80 mesh, i.e., granules which will pass through a screen having 10 openings per linear inch but will be retained on a screen having 80 openings per linear inch. Generally, granules which will pass through a screen having 20 openings per linear inch and be retained on a screen having 40 openings per linear inch or which will pass through a screen having 30 openings per linear inch and be retained on a screen having 60 openings per linear inch are preferred for commercial application.

The amount of water added is found to be quite critical in that there must be sufficient water to form the calcium sulphate dihydrate and provide the excess necessary to effect the pelletizing of the mixture. However, in no event, should the amount of water added be sufficient to form a slurry or suspension of the dry materials. If this is done, a large solid mass of plaster of Paris will eventually be formed, which mass is not suitable for application without subjecting it to various crushing and grinding operations in order to obtain a material of a usable particle size. Not only is the use of large amounts of water undesirable from the standpoint of the additional grinding and crushing operations necessary to obtain a suitable product, but, additionally, the large excess of water present in the composition must be removed thereby further increasing the production cost. Moreover, when the pesticidal material is quite soluble in water, in evaporating this large excess of water, the pesticide effloresces to the surface of the mass of plaster of Paris where it tends to shatter off thereby making it impossible to produce granules having a uniform pesticide concentration. It is for these reasons that it has been found necessary to use only sufficient water to form the calcium sulphate dihydrate and provide only enough excess to effect pelletizing of the composition. The pesticidal granules are, thus, easily formed with only a minimum amount of crushing and drying required so as to provide granules of a uniform composition at a considerable reduction in manufacturing cost.

It is believed that those skilled in the art can readily ascertain the amount of water required in each instance. This amount of water will, of course, depend on both the amount of plaster of Paris present in the mixture as well as the total amount of all of the dry substituents. Generally, it has been found that an amount of water which is about 2–6 times the amount required to form the calcium sulphate dihydrate will be sufficient to effect the required pelletizing of the composition without forming a slurry or suspension of the material.

The present method may be conveniently carried out in equipment similar to that which is commonly used by the fertilizer industry in producing granular fertilizers. The plaster of Paris, pesticidal powder or dust concentrate and the other desired supplements, such as, clay or wood flour, are added to a premixer wherein these various materials are blended. From the premixer, the dry mixture is metered into a wet rotating granulator wherein metered water is introduced to the dry mixture. In the granulator, the dry material is formed into wet balls of about ⅛ inch in diameter, which are then passed to a rotary dryer operating at about 100° C. When the granulated material is dry, it is cooled and passed to a crusher and then screened to obtain the granulated particles of the desired size. The oversized particles are returned to the crusher while the undersized particles are returned to the wet granulator.

In order that those skilled in the art may better understand the composition of the present invention and the method in which it may be used, the following specific examples are given:

EXAMPLE 1

A mixture is made containing 79 parts by weight plaster of Paris and 8 parts by weight Natrin 80–S (sodium 2,4,5-trichlorophenoxyethyl sulphate). To this mixture is added 30 parts by weight water with constant stirring until the mixture forms wet balls of about ⅛ inch in diameter. These wet balls are dried at 100° C., crushed, and screened, to obtain a granular mix which will pass through a screen having 20 openings per linear inch but will be retained on a screen which has 40 openings per linear inch. These granules are found to be hard and do not disintegrate in water, but allow the water-soluble pesticide to be leached out. The finished granules are found to contain 8% by weight of the pesticide material (Natrin 80–S).

EXAMPLE 2

A dry mix is made containing 69 parts by weight plaster of Paris and 20 parts by weight 50% wettable powder of 3,4-dichlorotetrahydrothiophene 1,1-dioxide. To this dry mix is added 30 parts by weight water with constant stirring until balling in the mixture occurs. The mixture is dried at 100° C., ground and screened and the granules collected which pass through a screen having 20 openings per linear inch but are retained on a screen having 40 openings per linear inch. These granules are found to be hard and do not disintegrate in water. The final mixture is found to contain 10% by weight of the pesticide.

EXAMPLE 3

Pesticidal granules are formed as in Example 2, with the exception that 3,3,4,4-tetrachlorotetrahydrothiophene 1,1-dioxide is used as the pesticidal agent. The granules collected are those which pass through a screen having 30 openings per linear inch, but which are retained on a screen having 60 openings per linear inch. The granules are found to be hard and do not disintegrate in water and contain 10% by weight of the pesticidal material.

EXAMPLE 4

A dry mix is made containing 69 parts by weight plaster of Paris and 20 parts by weight 50% wettable powder of DDT. To this mixture is added 35 parts by weight water with constant stirring until balling of the mixture is produced. The mixture is dried at 100° C., cooled, crushed and screened. The granules collected are those which pass through a screen having 30 openings per linear inch but are retained on a screen having 60 openings per linear inch. These granules are found to be hard and do not disintegrate in water and contain 10% by weight of the pesticide material.

EXAMPLE 5

A dry mix is made which contains 5 parts by weight 2,4-D acid, 16 parts by weight attaclay and 68 parts by weight plaster of Paris. To this mixture is added with constant stirring 35 parts by weight of water until balling is produced in the mixture. The wet mix is dried at 200° F., ground, screened, and the particles which pass through a screen having 20 openings per linear inch and are retained on a screen having 40 openings per linear inch are collected. These granules are found to be hard but do disintegrate slowly in water and contain 4% by weight of the pesticidal materials.

EXAMPLE 6

A pesticidal granule composition is made in the same manner as in Example 5, with the exception that 4 parts by weight 2,4,5-T are used as the pesticidal material. As in Example 5, the granules collected are those which pass through a screen having 20 openings per linear inch and are retained on a screen having 40 openings per linear inch. These granules are found to be hard but do disintegrate slowly in water and contain 4% by weight of the pesticidal agent.

EXAMPLE 7

A dry mix is made containing 76 parts by weight plaster of Paris, 2 parts by weight 50% dust concentrate of dimethyl-2,3,5,6-tetrachloroterephthalate and 10 parts by weight bentonite. To this dry mix is added 40 parts by weight water with constant stirring until balling in the mixture is produced. The moist mixture is dried at 100° C., ground, screened and the granules which pass through a screen having 20 openings per linear inch and are retained on a screen having 40 openings per linear inch are collected. These granules are found to be hard, disintegrate slowly in water and contain 1% by weight of the pesticidal material.

EXAMPLE 8

A dry mix is made which contains 69 parts by weight plaster of Paris, 10 parts by weight 50% wettable powder of dimethyl-2,3,5,6-tetrachloroterephthalate, 5 parts by weight attaclay and 5 parts by weight wheat flour. To this mixture is added 35 parts by weight water with constant stirring until the mixture begins to ball. The moist mixture is dried at 100° C., ground, screened and the granules which pass through a screen having 30 openings per linear inch and are retained on a screen having 60 openings per linear inch are collected. These granules are found to be hard, distingrate slowly in water and contain 5% by weight of the pesticidal material.

EXAMPLE 9

A dry mix is made which contains 30 parts by weight plaster of Paris, 3 parts by weight 50% wettable powder of dimethyl-2,3,5,6-tetrachloroterephthalate, 40 parts by weight Wyoming bentonite and 21.69 parts by weight agricultural gypsum. To this mixture is added 35 parts by weight water with constant stirring until pelletizing of the mixture takes place. The moist pellets are dried at 100° C. and screened, and the pellets which pass through a screen having 30 openings per linear inch and are retained on a screen having 60 openings per linear inch are collected. These pellets are found to be hard but disintegrate rapidly in water and contain 1.5% by weight of the pesticidal material.

EXAMPLE 10

A granular composition is made as in Example 9 with the exception that 10 parts by weight of the pesticidal material, dimethyl-2,3,5,6-tetrachloroterephthalate, and 14.8 parts by weight of the agricultural gypsum are used. The granules thus formed are found to be hard, but disintegrate rapidly in water and contain 5% by weight of the pesticidal material.

EXAMPLE 11

A granular composition is made as in Example 9 with the exception that 19.7 parts by weight of the pesticidal material, dimethyl - 2,3,5,6-tetrachloroterephthalate, and 5.1 parts by weight of agricultural gypsum are used. The granules thus produced are found to be hard, disintegrate rapidly in water and contain 10% by weight of the pesticidial material.

EXAMPLE 12

A dry mix is made which contains 83.5 parts by weight plaster of Paris and 3 parts by weight 50% wettable powder of dimethyl-2,3,5,6-tetrachloroterephthalate. To this mixture is added 36.7 parts by weight of water with constant stirring until pelletizing of the mixture takes place. The moist pellets are then dried at 100° C., screened and the pellets which pass through a screen having 30 openings per linear inch and are retained on a screen having 60 openings per linear inch are collected. These pellets are found to be hard, undergo substantially no disintegration in water and contain 1.5% by weight of the pesticidal material.

EXAMPLE 13

To show the biological activity of the granule pesticides of the present invention, 97.6 parts by weight plaster of Paris and 2.4 parts by weight Natrin 80–S (sodium 2,4,5-trichlorophenoxyethyl sulphate) are mixed together. To this dry mix is added 30 parts by weight water with constant stirring until balling of the mixture is produced. The balled mixture is dried at 100° C., screened, crushed and the particles which pass through a screen having 20 openings per linear inch and are retained on a screen having 40 openings per linear inch are collected. These granules are applied to test plots containing tomatoes prior to the emergence of the broadleaf weeds and grasses, at the rate of 3 to 6 pounds per acre. After a period of three weeks, the test plots are evaluated to determine the effectiveness of the granular formulation of Natrin 80-S with regard to broadleaf weed control, grass control and phytotoxic effect on tomatoes.

EXAMPLE 14

To test plots, similar to those in Example 13, a liquid solution of Natrin 80-S is applied, also at the rate of 3 and 6 pounds active ingredients per acre. After a period of three weeks, the test plots are evaluted to determine the effectiveness of the liquid formulations of the Natrin 80-S with regard to broadleaf weed control, grass control and the phytotoxic effect on the tomatoes.

In the evaluations of Examples 13 and 14, the following indexes are used.

Broadleaf control:
  0—None
  1—Less than 20
  2—Scattered 20 to 100
  3—Two or more areas of good germination
  4—Heavy germination over 60% of plot
  5—Heavy germination over entire plot Grasses:
  0—None
  1—Less than 50
  2—Good germination in scattered areas
  3—Good germination over wide area
  4—Heavy germination over 60% of plot
  5—Heavy germination over entire plot Phytotoxic response of tomatoes:
  0—None
  1—Slight injury to less than 50% of plants
  2—Slight injury and arrested growth of all plants
  3—Marked injury of to less than 50% of the plants
  4—Marked injury to more than 50% of the plants
  5—Severe injury to more than 75% of the plants Using these indexes, the following results are obtained:

Table I
For Examples 13 and 14

| Application Rate of Active Material, Pounds/Acre | Formulation | Weeds Broadleaf | Weeds Grasses | Tomatoes |
|---|---|---|---|---|
| 3 | Granular | 1.75 | 2.00 | 0 |
|   | Solution | 1.50 | 1.75 | .75 |
| 6 | Granular | .25 | .75 | 1.50 |
|   | Solution | .50 | 1.25 | 4.00 |
| Check | | 4.75 | 4.25 | 0 |

From these results it is seen that the granular formulation and liquid formulation give substantially the same results both at 3 and 6 pounds per acre applications, as to broadleaf weeds and grass control. However, with regard to the phytotoxic effect on tomatoes, that of the granular formulation is substantially below that of the liquid formulation.

The following results show in more detail the phytotoxic response of the tomato plants to applications of both granular and solution formulations of the Natrin 80.

Table II
For Examples 13 and 14

| Application Rate of Active Material Pounds/Acre | Formulation | Percentage of Treated Plants Dead | Percentage of Treated Plants Injured | Percentage of Treated Plants Dead or Injured | Percentage of Live Plants to Bear Fruit |
|---|---|---|---|---|---|
| 3 | Granular | 4.3 | 13.6 | 17.4 | 68.2 |
|   | Solution | 0 | 45.5 | 45.5 | 59.1 |
| 6 | Granular | 8.7 | 28.6 | 34.8 | 47.6 |
|   | Solution | 38.0 | 84.6 | 82.6 | 7.7 |
| Check | | 0 | 15.0 | 12.5 | 65.2 |

From these results, it is seen that at an application rate of 3 pounds per acre, nearly 10% more of the tomato plants treated with the granular formulation bore fruit than those treated with the solution formulation. Even more striking, is the fact that 40% more of the plants which were treated at the rate of 6 pounds per acre of the granular formulation bore fruit than those treated with the liquid formulation at 6 pounds/acre. It is, thus, obvious, from these tables, that the granular formulation of the present invention gives marked advantages as to biological activity and selectivity over a solution formulation.

While the method of the present invention has been described with primary references to the preparation of pesticidal compositions, it is to be appreciated that other biologically active materials, such as for example, plant growth regulants which are absorbed through the root systems of the plants, can also be so prepared.

While there has been described an embodiment of the invention, the products and methods described are not intended to be understood as limiting the scope of the invention, as it is realized that changes and alterations therewithin are possible and that it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. A method of making a biologically active composition comprising forming a dry mixture comprising a dehydrated calcium sulfate and a biologically active material, slowly adding water to said dry mixture, mixing said dry mixture and water so as to form pellets comprised of calcium sulfate dihydrate and having the biologically active material intimately and substantially uniformly dispersed therethrough; the total amount of water added to said dry mixture being sufficient only to form the dihydrate of the calcium sulfate and effect pelletizing of said mixture, said total amount of water being from about 2 to 6 times the amount required to form the dihydrate.

2. The method as claimed in claim 1 wherein the dehydrated calcium sulphate is plaster of Paris.

3. A method of making a pesticidal composition comprising forming a dry mixture comprising essentially a dehydrated calcium sulfate and a pesticide, slowly adding water to said dry mixture, mixing said dry ingredients and water so as to effect the formation of pellets comprising the dihydrate of calcium sulfate and having intimately and substantially uniformly dispersed therein the pesticidal material, the total amount of water added to said dry mixture being sufficient only to form the dihydrate of said calcium sulfate and effect pelletizing of the mixture, said total amount of water being from about 2 to 6 times the amount required to form the dihydrate.

4. The method as claimed in claim 3 wherein the dehydrated calcium sulphate is plaster of Paris.

5. A method of making a pesticidal composition comprising forming a dry mixture containing 25 to 98 parts by weight of plaster-of-Paris, 2 to 40 parts by weight of a pesticide and 0 to 60 parts by weight of clay, slowly adding water to said dry mixture, mixing the dry mixture and water to effect the formation of pellets comprising calcium sulfate dihydrate and having intimately and substantially uniformly dispersed therein said pesticide and drying the thus formed pellets, the total amount of water added to said mixture being sufficient only to convert the plaster-of-Paris to calcium sulfate dihydrate and effect pelletizing of the mixture, said total amount of water being from about 2 to 6 times the amount required to convert the plaster-of-Paris to calcium sulfate dihydrate.

6. The method as claimed in claim 5 wherein the pellets formed are of a particle size which will pass through a screen having 10 openings per linear inch but which will be retained on a screen having 80 openings per linear inch.

7. The method as claimed in claim 5 wherein a portion of the clay is replaced with a swelling agent.

References Cited in the file of this patent

UNITED STATES PATENTS

| | | |
|---|---|---|
| 1,973,473 | Edwards | Sept. 11, 1934 |
| 2,242,639 | Barton | May 20, 1941 |
| 2,592,540 | Cassil et al. | Apr. 15, 1952 |
| 2,809,469 | Hartley | Oct. 15, 1957 |

FOREIGN PATENTS

| | | |
|---|---|---|
| 227,098 | Australia | Mar. 27, 1958 |